United States Patent [19]

Grage et al.

[11] 4,451,146

[45] May 29, 1984

[54] TEST DEVICE FOR DETERMINING THE EXTINCTION VALUE OF A LASER RANGE FINDER

[75] Inventors: Ludger Grage, Eichenau; Werner Ryseck, Oberschleissheim, both of Fed. Rep. of Germany

[73] Assignee: Siemens Aktiengesellschaft, Berlin and Munich, Fed. Rep. of Germany

[21] Appl. No.: 301,400

[22] Filed: Sep. 11, 1981

[30] Foreign Application Priority Data

Sep. 16, 1980 [DE] Fed. Rep. of Germany ....... 3034942

[51] Int. Cl.³ .............................................. G01C 3/08
[52] U.S. Cl. ....................................... 356/5; 356/446; 434/4
[58] Field of Search .......................... 356/5, 446; 434/4

[56] References Cited

U.S. PATENT DOCUMENTS

| | | | |
|---|---|---|---|
| 4,068,952 | 1/1978 | Erbert et al. | 356/5 |
| 4,121,890 | 10/1978 | Braun | 356/5 |
| 4,139,769 | 2/1979 | McCrum et al. | 250/341 |
| 4,167,328 | 9/1979 | Cross et al. | 356/5 |
| 4,189,233 | 2/1980 | Hurt et al. | 356/5 |
| 4,314,762 | 2/1982 | Gresko | 356/150 |

OTHER PUBLICATIONS

A. Richelt et al., "Improved Optical Tapping Elements for Graded-Index Optical Fibers", *Siemens Forsch.-u. Entwickl.-Ber*, vol. 8, No, 3, 1979, pp. 130–135.

G. Knoblauch, "Informationsübertragung über Lichtwellenleiter im industriellen Bereich", *Siemens Components*, 18, 1980, pp. 144–150.

*Primary Examiner*—S. C. Buczinski
*Attorney, Agent, or Firm*—Hill, Van Santen, Steadman & Simpson

[57] ABSTRACT

A test device for determining the extinction value of a laser range finder having a laser transmitter and a laser receiver characterized by the device having an optical shield for shielding an unattenuated laser beam from the transmitter, a filter chamber containing attenuation filters being disposed in the optical beam path, a scatter unit having a dispersion disk having a scattering range for diffusely scattering the laser light, an optical coupling unit for coupling light into the laser receiver and at least one light waveguide line of a specific length having one end disposed in the scatter range of the dispersion disk and the other end for releasing the light traveling in the waveguide into an optical beam so that the laser light pulses from the transmitter are both attenuated and scattered prior to being coupled into the receiver. The test device enables checking the system sensitivity of laser range finders.

14 Claims, 3 Drawing Figures

TEST DEVICE FOR DETERMINING THE EXTINCTION VALUE OF A LASER RANGE FINDER

BACKGROUND OF THE INVENTION

The present invention is directed to a test device for determining the extinction value of a laser range finder with an optical attenuation filter disposed in an optical beam path of the laser range finder.

The laser range finders or laser ranging systems are already employed in a wide scope for various uses. For example, in a military use, they are used for the precise and rapid determination of the range of an object for example the distance between the target object and a weapon. The range of the laser range finders depends on one hand on the intrinsic performance data and on the other hand on parameters which are not device specific and which can hardly be determined in practice. Thus, an objective determination of a range by means of the measuring of natural targets in an open terrain and then comparing the various laser range finders to one another is not always possible. Likewise, it is very difficult to determine the individual data of the laser range finder for example the output power and the receiver sensitivity with a sufficient precision when limiting the cost of the test equipment to a justifiable amount.

Hitherto, this problem is solved by means of a so-called extinction measurement. The determination of the extinction value can be executed as follows on the basis for example for an arrangement schematically illustrated in FIG. 1. A large target panel z with known scattering properties is erected at a specific distance from a laser range finder L. Upon insertion of a calibrated attenuation filter F in an optical beam path of the laser range finder L, this distance is measured. What is defined as an extinction value is for example the attenuation in decibels in which a 50% reduction probability is still achieved. In particular this test method has the following disadvantages, a change of the reflective properties of the target panel z will occur due to atmospheric influences and conditions. Further, particularly upon employment of YAG-Nd lasers specific protective and safety measurements against damage to personnel's eyes must be undertaken when measuring natural target in an open terrain. Another disadvantage of this test method is that a relatively large amount of space is required and the measurements can only be carried out in fair weather conditions.

SUMMARY OF THE INVENTION

The present invention is directed to creating a test unit or device for determining the extinction value of the laser range finder which device for a lowest possible cost enables obtaining object determination, which is independent of external influences and is precise as possible, of the performance data which will determine the range of the laser range finder. The present invention also enables simultaneously making the determination and providing complete protection against the dangerous laser radiation.

To accomplish these goals, the present invention is directed to a test device for determining the extinction value of the laser range finder having a laser transmitter and receiver, said device comprising an optical shield for shielding an unattenuated laser beam from the transmitter, a filter chamber containing attenuation filters being disposed in an optical beam path, a scatter unit having means for diffusely scattering a beam of laser light including a dispersion disk having a scatter range, an optical coupling unit for coupling light into the laser receiver and at least one light waveguide of a specific length having one end disposed in the scatter range of the dispersion disk and the other end for releasing the light traveling in said waveguide into the optical beam path so that the unattenuated beam of laser light from the transmitter is both attenuated and scattered prior to being coupled into the receiver.

Preferably, the filter chamber is arranged on the optical beam path of the laser transmitter and is spaced from the laser transmitter by the optical shield. In this preferred embodiment, the scatter device or unit is arranged to receive the optical beam after it passes through the filter chamber and has been attenuated.

When making a measurement of the extinction value with the test device, a light pulse emitted by the laser transmitter is directed onto the dispersion disk which is disposed in the scatter unit and the light is then scattered by this disk. The one end of the light waveguide line is positioned in a scatter range of the dispersion disk and a part of the scattered laser light is coupled into the waveguide line. After the traversal of the coupled light pulse through the light waveguide, one component is directed into the receiver of the laser range finder by means of an optical coupling device or unit. The telemetric value measured by the laser range finder corresponds to half the transit time through the light waveguide line. By means of increasing the attenuation value in the filter chamber, the attenuation value can be determined at a 50% detection probability. The overall attenuation value is composed of the attenuation of the test device without the filter chamber which is known as the attenuation constance or value of the apparatus and the amount of attenuation, which is inserted into the optical beam path by the filters in the filter chamber and represents a measure for the range of the measured laser range finder. This overall attenuation can then be converted to the extinction value according to the target panel method.

The inventive test device has a low cost outlay and renders possible an extinction determination of a laser range finder wherein the measurement can also be carried out in a closed space and without endangering personnel with the laser radiation. For this reason, the determination of the extinction value by the test device is also independent of the external influences.

It has proven particularly advantageous to use a collimator with a beam splitter as the optical coupling unit for the test device.

A particularly simple format of the inventive test device is that the filter chamber, the scatter unit or device, the light waveguide line and the optical coupling unit are designed as independent functioning units with their own respective housings. However, it is also an advantageous embodiment of the test device which has the scatter unit, the light waveguide line and the optical coupling unit combined in a single test unit with its own single housing. This embodiment is particularly expedient when in particular it is used in conjunction with a collimator and when the optical coupling device has a collimator with an optical axis and the test device is utilized to measure and adjust the optical axes of the laser ranging system or range finder. The single test unit then will enable both the adjustment of the optical axes as well as a measurement of the extinction value of the laser ranging system.

It is also advantageous to provide a photo element, which is connected to a power measurement unit, in the scatter range of the dispersion disk. With the photo element in the scatter unit, the test device can measure the power output of the laser transmitter in addition to its other functions.

An embodiment of the test device utilizes a plurality of light waveguides which extend between the scatter unit and the coupling unit. Thus, when given two light waveguide lines, it is advantageous for the additional light waveguide line to exhibit a length that is different than the length of the first mentioned light waveguide line so that two distinct measuring paths will occur. A function check of the double echo evaluation or respectively a check of the depth resolution can be executed by means of diverting a light component of the transmission beam pulse via the additional optical delay line formed by the second path.

DESCRIPTION OF THE PREFERRED EMBODIMENTS

Figure 1:
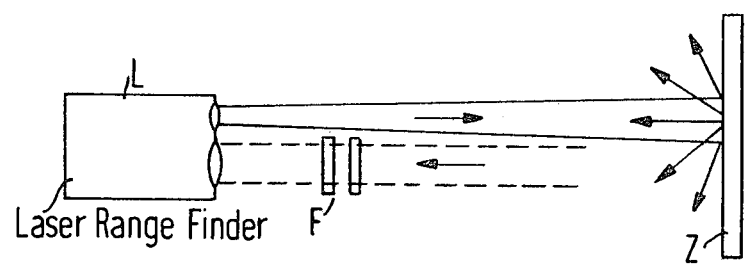
FIG. 1 schematically illustrates a prior art method for determining the extinction value of a laser range finder.
Figure 2:
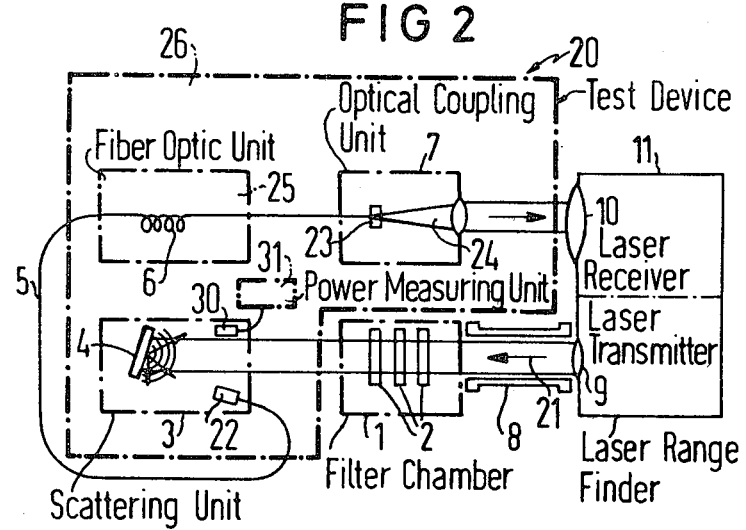
FIG. 2 schematically illustrates a test device in accordance with the present invention.

The principles of the present invention are particularly useful in a test device generally indicated at 20 and schematically illustrated in FIG. 2. The device 20 consists of a filter chamber 1, a scattering unit or device 3, at least one light waveguide line 5, an optical coupling device 7 and an optical shield 8. The test device 20 of the present invention is particularly useful for testing a laser range finder 11 which has a laser transmitter with an output optic or lens 9 and a laser receiver having an input optic or lens 10.

As illustrated, the filter chamber 1 of the device 20 contains a plurality of optical attenuation filters 2 which may be calibrated glass filters or stained glasses and are positioned in the filter chamber 1 so that when it is inserted in an optical beam path such as the output beam 21 of the laser transmitter, the beam of the laser beam 21 will be attenuated. The optical shield 8 is a closed protective tubular body and is positioned between the output optic 9 of the transmitter and the housing of the filter chamber 1. The scatter unit 3 preferably follows the filter chamber 1 and receives the attenuated laser beam pulses as they travel on a beam path from the laser transmitter. If need be, it can be mechanically coupled to the filter chamber 1. The scattering device 3 has means for scattering the laser beam which includes a dispersion disk 4 which diffusely scatters the laser light of the transmission beam. One end 22 of the light waveguide line 5 is positioned in a scatter range of the dispersion disk 4 so that scattered light pulses will be coupled into the line 5. The light waveguide line 5 represents an optical delay line and exhibits a specific length for example in a range of approximately 300 and 900 m. The line 5, which is preferably an optical fiber, is wound into a coil 6 in a optical or optic unit 25. The other end 23 of the light waveguide line 5 is positioned to emit the pulse traveling in the line in an optical beam path 24 which is coupled by the optical coupling unit 7 into the input optic 10 of the laser receiver. Preferably the beam path 24 is formed by a collimator having a beam splitter which is disposed in the optical coupling unit 7.

The scatter unit 3, the light waveguide 5 and the optical coupling unit 7 can be advantageously combined to form an independent unit having its own housing 26 which is shown in broken lines. In this case, the filter chamber 1, can be accommodated for example in an optical adapter coupling unit which couples the test unit optically to the laser range finder and is designated as an independent unit.

Figure 3:
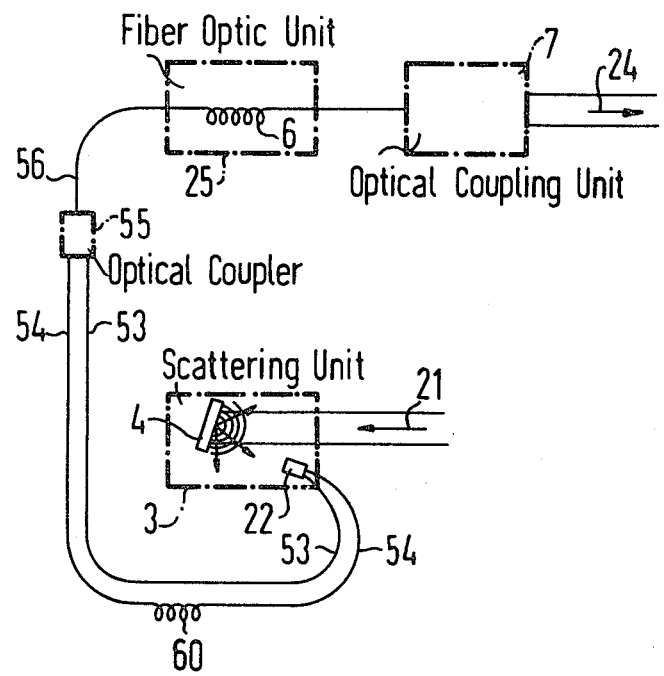
FIG. 3 schematically illustrates an embodiment of the waveguides extending from the scatter unit to the optical coupling unit of the present invention.

An advantageous further embodiment of the test device according to FIG. 2, is illustrated in FIG. 3 and has a plurality of for example two light waveguide lines 53, 54 formed by optical fibers which extend or are coupled between the scatter unit 3 and the optical coupling unit 7. These additional light waveguide lines 53, 54 can be a pair of optical fiber groups which are formed by a pair of separate fibers or lines which are coupled via a conventional optical coupler 55 to a common fiber 56 which extends from the point of the coupler 55 to the coupling unit 7. The other end of the separate fiber lines 53 and 54 are positioned in the scatter range of the disk 4 so that the scatter laser light pulse is coupled into each of the separate fibers 53 and 54. Examples of know conventional optical couplers are disclosed in by G. Knoblauch, "Informationübertragung über Lichtwellenleiter Im Industriellen Bereich", *Siemens Components* Vol. 18, No. 3, 1980, pages 144–150 and by A. Reichelt et al, "Improved Optical Tapping Elements for Graded-Index Optical Fibers", *Siemens Forsch.-u.-Entwickl.-Ber.*, Vol. 8, No. 3, 1979, pages 130–135. Thus, a common waveguide or fiber 56 will extend from the coupler 55 to the optical coupling unit 7. This arrangement advantageously enables the additional optical delay line to be formed by the second waveguide line or separate fiber 54 which will have a different length due to a coil 60 than the first mentioned light waveguide line 53 and provides a differential length corresponding to a specific measuring path that occurs due to the additional bypass. Thus, with the two time delays, the test device can check echo evaluations and also check depth resolutions.

Also, a photo element, for example a photo detector 30, may be positioned in the scatter range of the dispersion disk 4. The photo detector 30 is connected to a measuring unit 31 and enables measuring the power output of the laser transmitter.

Although various minor modifications may be suggested by those versed in the art, it should be understood that we wish to embody within the scope of the patent granted hereon, all such modifications as reasonably and properly come within the scope of our contribution to the art.

We claim:

1. A test device for determining the extinction value of a laser range finder having a laser transmitter and a laser receiver, said device comprising an optical shield for shielding an unattenuated laser beam from the laser transmitter, a filter chamber containing attenuation filters being disposed in an optical beam path of the laser transmitter, a scatter unit having means for reflectively diffusely scattering the beam of laser light from the laser transmitter and including a reflective dispersion disk having a scatter range, an optical coupling unit for coupling light in a beam path into the laser receiver and at least one light waveguide line of a specific length having one end being disposed in the scatter range of the dispersion disk of the scatter unit to receive scatter light therefrom and the other end being positioned for releasing the light traveling in said waveguide into the optical beam path of the receiver so that the unattenuated beam of laser light from the transmitter is both attenuated and scattered prior to being coupled into the receiver.

2. A test device according to claim 1, wherein the optical shield is disposed between the laser transmitter and the filter chamber which is in the optical beam path of the laser transmitter.

3. A test device according to claim 2, wherein the scatter unit is arranged to receive attenuated light from the filter chamber.

4. A test device according to claim 1, wherein each of the attenuation filters comprises a calibrated glass filter.

5. A test device according to claim 1, wherein the filter chamber, the scatter unit, the optical coupling unit and the light waveguide lines are each designed as separate units having separate housing.

6. A test device according to claim 1, wherein the scatter unit, the light waveguide line, and the optical coupling device are combined in a single test unit having a single housing.

7. A test device according to claim 1, wherein the optical shield comprises a closed tubular body.

8. A test device according to claim 1, which includes a photo element connected to a power measuring unit, said photo element being disposed in the scatter range of the dispersion disk to enable determining the power output of the laser.

9. A test device according to claim 1, wherein the light waveguide line is wound into a coil.

10. A test device according to claim 1, wherein the waveguide line has a first portion extending from the scatter unit to an optical coupler and a second portion extending from the optical coupler to the optical coupling unit and said device including a second waveguide line having a length different than the length of the first portion of the first mentioned line, said second waveguide line having one end being disposed in the scatter range for receiving scatter light and the other end being connected to the coupler so that the second portion acts as a common portion to convey light from two paths in the first portion to the coupling unit.

11. A test device for determining the extinction value of a laser range finder having a laser transmitter and a laser receiver, said device comprising an optical shield for shielding an unattenuated laser beam from the laser transmitter; a filter chamber containing attenuation filters being disposed to receive the laser beam leaving the shield; a scatter unit receiving light from the filter chamber and having means for reflectively, diffusely scattering the beam of attenuated laser light including a reflective dispersion disk having a scatter range; an optical coupling unit for coupling light in a beam path into the laser receiver and at least one light waveguide line of a specific length having one end being disposed in the scatter range of the reflective dispersion disk to receive scatter light and the other end being positioned for releasing the light traveling in said waveguide into the optical coupling unit so that the unattenuated beam of laser light from the transmitter is both attenuated and scattered prior to being coupled into the receiver.

12. A test device according to claim 11 wherein the filter chamber, the scatter unit, the optical coupling unit and the light waveguide lines are each designed as separate units having separate housing.

13. A test device according to claim 11 wherein the scatter unit, the light waveguide line, and the optical coupling unit are combined in a single test unit having a single housing.

14. A test device according to claim 11, wherein the waveguide line has a first portion and a second portion connected together by an optical coupler, said second portion being coiled said device includes a second waveguide line having one end being disposed in the scatter range to receive light and the other end connected to said optical coupler, said second waveguide being of a different length than the first portion of the first mentioned waveguide line.

* * * * *